US010209709B2

(12) United States Patent
Peters et al.

(10) Patent No.: US 10,209,709 B2
(45) Date of Patent: Feb. 19, 2019

(54) LIDAR SENSOR FROST DETECTION

(71) Applicant: Ford Global Technologies, LLC, Dearborn, MI (US)

(72) Inventors: Cindy Anne Peters, Canton, MI (US); Mark Edward Nichols, Saline, MI (US); Sabrina Louise Peczonczyk, Ann Arbor, MI (US); Kerrie Nikaido Holguin, Ann Arbor, MI (US); Elyssa Kayser, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/236,701

(22) Filed: Aug. 15, 2016

(65) Prior Publication Data
US 2018/0046183 A1    Feb. 15, 2018

(51) Int. Cl.
*G05D 1/00* (2006.01)
*B60W 50/08* (2012.01)
*G01S 17/95* (2006.01)
*G01S 17/93* (2006.01)
*B60W 50/00* (2006.01)
*G01S 7/497* (2006.01)

(52) U.S. Cl.
CPC ......... *G05D 1/0061* (2013.01); *B60W 50/082* (2013.01); *G01S 17/936* (2013.01); *G01S 17/95* (2013.01); *G05D 1/0088* (2013.01); *B60W 2050/0043* (2013.01); *B60W 2550/12* (2013.01); *G01S 2007/4977* (2013.01); *G05D 2201/0213* (2013.01)

(58) Field of Classification Search
None
See application file for complete search history.

(56) References Cited

U.S. PATENT DOCUMENTS

| 6,107,956 | A | 8/2000 | Russell et al. |
|---|---|---|---|
| 6,611,227 | B1 | 8/2003 | Nebiyeloul-Kifle et al. |
| 7,965,336 | B2 | 6/2011 | Bingle et al. |
| 8,671,504 | B2 | 3/2014 | Ono et al. |
| 9,090,213 | B2 * | 7/2015 | Lawlor ..................... B60R 1/12 |
| 9,718,405 | B1 * | 8/2017 | Englander .............. B60Q 9/008 |

(Continued)

FOREIGN PATENT DOCUMENTS

| CN | 103471633 A | 12/2013 |
|---|---|---|
| CN | 103448684 B | 2/2016 |
| WO | 2016073144 A1 | 5/2016 |

OTHER PUBLICATIONS

Oshana et al., Software Engineering for Embedded Systems: Methods, Practical Techniques, and Applications, 2013 (Year: 2013).*

(Continued)

*Primary Examiner* — Tamara L Weber
(74) *Attorney, Agent, or Firm* — Frank A. MacKenzie; Bejin Bieneman PLC

(57) ABSTRACT

A vehicle system includes a processor programmed to receive sensor signals from a LIDAR sensor. The processor estimates frost accumulation on the LIDAR sensor from the sensor signals and compares the estimated frost accumulation to a predetermined threshold. The processor further prevents a host vehicle from operating in an autonomous mode if the estimated frost accumulation exceeds the predetermined threshold.

19 Claims, 3 Drawing Sheets

(56) References Cited

U.S. PATENT DOCUMENTS

| | | |
|---|---|---|
| 2002/0175802 A1 | 11/2002 | Horlebein |
| 2004/0257556 A1 | 12/2004 | Samukawa et al. |
| 2010/0106363 A1* | 4/2010 | Mandujano ........ B60H 1/00657 |
| | | 701/36 |
| 2013/0107110 A1 | 5/2013 | Park et al. |
| 2015/0233070 A1* | 8/2015 | Duncan .................... E01H 5/10 |
| | | 219/201 |
| 2015/0266489 A1* | 9/2015 | Solyom ............... B60W 50/029 |
| | | 701/23 |
| 2016/0176384 A1 | 6/2016 | Dissette et al. |
| 2016/0223658 A1 | 8/2016 | Hallek et al. |

OTHER PUBLICATIONS

Search Report dated Jan. 4, 2018 from UK Intellectual Property Office regarding GB Application No. 1712798.6 (5 pages).

* cited by examiner

LIDAR SENSOR FROST DETECTION

BACKGROUND

Vehicles used in cold climates are subject to frost accumulation. Frost typically accumulates when humid air cools on vehicle windows, leaving behind a thin film of ice. Because frost can inhibit the driver's view, some or all of the frost must be removed before the vehicle can be manually operated.

DETAILED DESCRIPTION

Frost can accumulate on many different types of surfaces, including the lens of a LIDAR sensor. While the driver of a vehicle operating in a non-autonomous mode may see and remove frost from the windows prior to operating the vehicle, some drivers may not think to look for and remove frost buildup from the lens of a LIDAR sensor. Moreover, autonomous vehicles with no occupants may not have any way to determine whether frost is interfering with the LIDAR sensor.

One solution includes a frost detection system that prevents an autonomous vehicle from operating in an autonomous mode when frost has accumulated on the LIDAR sensor. An example frost detection system includes a processor programmed to receive sensor signals from the LIDAR sensor. The processor estimates frost accumulation on the LIDAR sensor from the sensor signals and compares the estimated frost accumulation to a predetermined threshold. The processor further prevents the vehicle from operating in an autonomous mode if the estimated frost accumulation exceeds the predetermined threshold.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
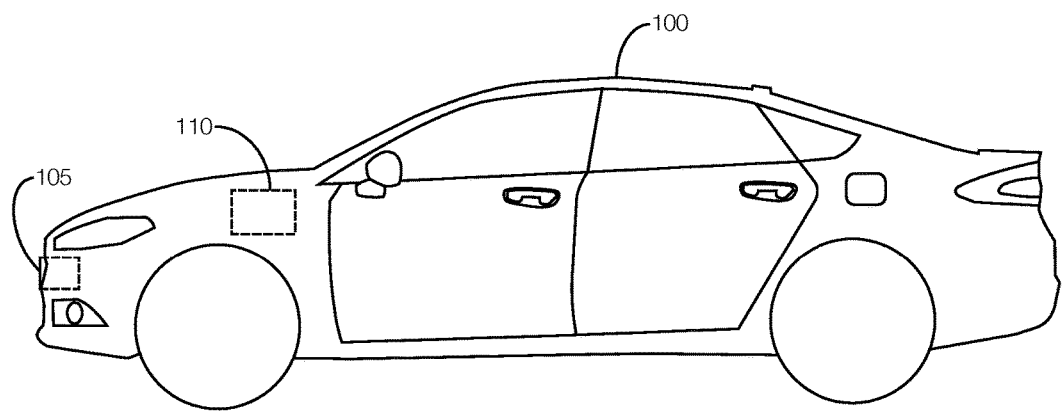
FIG. 1 illustrates an example vehicle with a frost detection system for estimating frost accumulation on a LIDAR sensor.

As illustrated in FIG. 1, the host vehicle 100 includes a LIDAR sensor 105 and a frost detection system 110. For example, the frost detection system 110 receives sensor signals output by the LIDAR sensor 105, estimates the frost accumulation on the LIDAR sensor 105 from the sensor signals, and determines whether the estimated amount of frost accumulation is likely to interfere with autonomous operation of the host vehicle 100. If so, the frost detection system 110 may temporarily prevent the host vehicle 100 from operating in the autonomous mode, at least until the frost can be cleared.

To help clear the frost more quickly, the frost detection system 110 may output a defrost signal that commands the LIDAR sensor 105 to execute a defrost operation. During the defrost operation, the frost detection system 110 may periodically monitor sensor signals output by the LIDAR sensor 105 to determine whether the frost is sufficiently clear for the LIDAR sensor 105 to operate. The frost detection system 110 may monitor the sensor signals output by the LIDAR sensor 105 while the host vehicle 100 is operating in a non-autonomous mode. Monitoring the sensor signals in this context may include periodically estimating whether the amount of frost accumulation is still likely to interfere with autonomous operation of the host vehicle 100. When the estimated frost accumulation is low enough, the frost detection system 110 may output a signal to permit autonomous operation. Even while operating autonomously, the frost detection system 110 may continue to monitor the LIDAR sensor 105 for frost buildup and permit or prevent autonomous operation of the host vehicle 100 accordingly.

Although illustrated as a sedan, the host vehicle 100 may include any passenger or commercial automobile such as a car, a truck, a sport utility vehicle, a crossover vehicle, a van, a minivan, a taxi, a bus, etc. Further, the host vehicle 100 is an autonomous vehicle that can operate in an autonomous (e.g., driverless) mode, a partially autonomous mode, and/or a non-autonomous mode.

Figure 2:
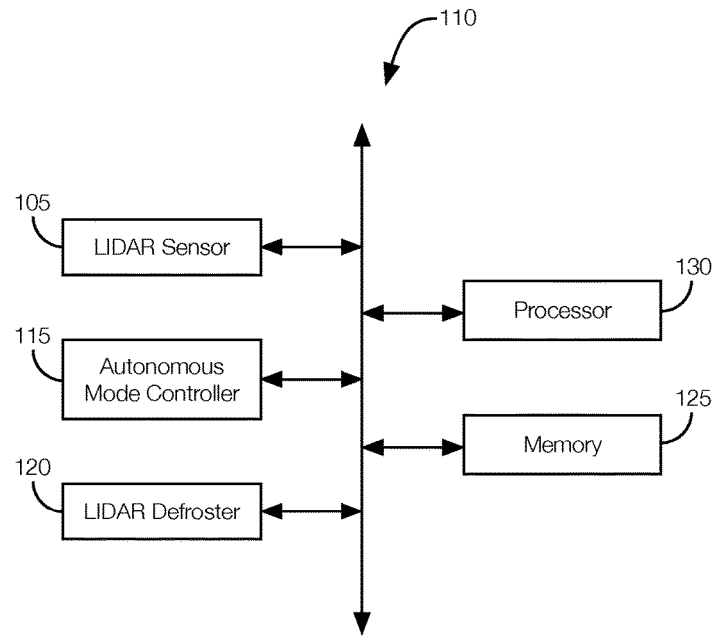
FIG. 2 is a block diagram illustrating example components of the frost detection system of FIG. 1.

Referring now to FIG. 2, the frost detection system 110 includes or works in conjunction with the LIDAR sensor 105, an autonomous mode controller 115, a LIDAR defroster 120, a memory 125, and a processor 130.

Figure 3A:
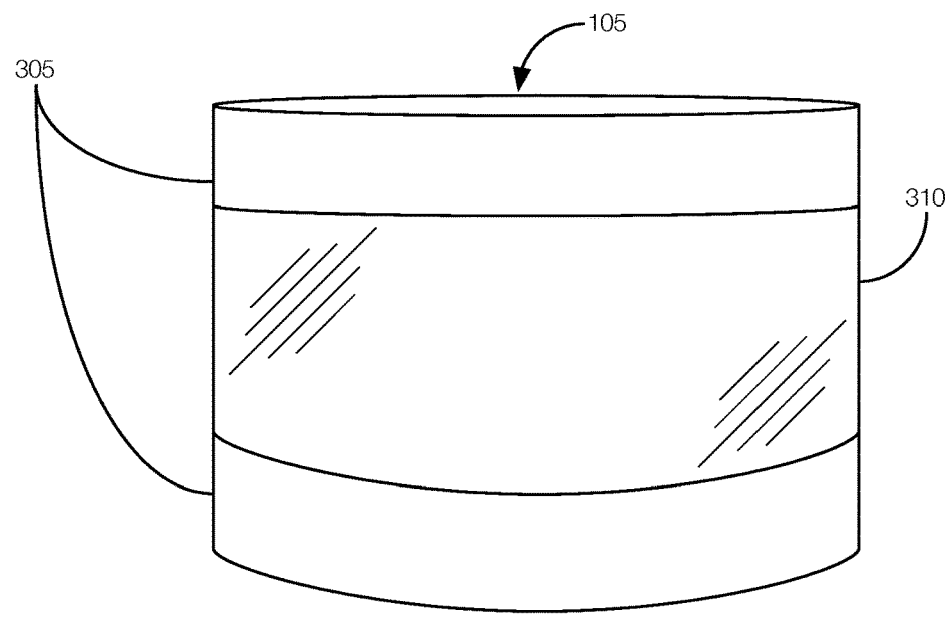
FIG. 3A illustrates an example LIDAR sensor with a lens where frost may accumulate.
Figure 3B:
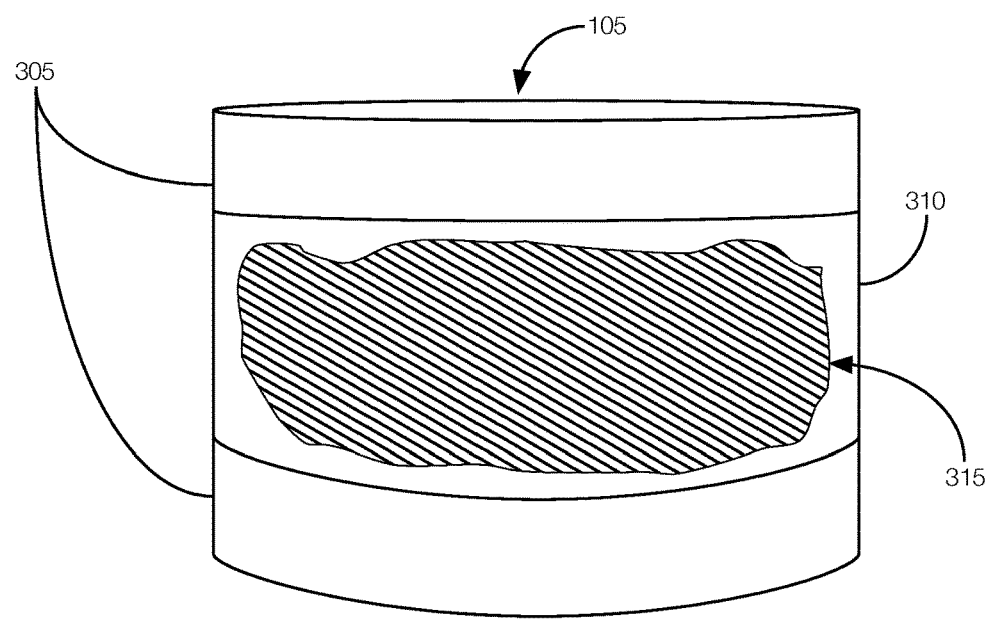
FIG. 3B illustrates the example LIDAR sensor of FIG. 3A with frost accumulation.

The LIDAR sensor 105 is implemented via circuits, chips, or other electronic components that can generate sensor signals representing objects near the host vehicle 100. The LIDAR sensor 105 transmits a beam of laser light, and reflections of the laser beam indicate whether an object has been detected. Moreover, reflections from nearby objects return to the sensor earlier than reflections from distant objects. Thus, the amount of time before reflected light is received may indicate the distance to an object. As shown in FIGS. 3A and 3B, the LIDAR sensor 105 includes a housing and a lens. Frost accumulation on the lens may interfere with the object detection of the LIDAR sensor 105. For instance, the frost may reflect light near instantaneously (e.g., as soon as the laser beam reaches the lens). Thus, sensor signals indicating an object covering large portions of the lens may be interpreted as frost. Similarly, sensor signals indicating that the laser beam is immediately scattered may suggest frost accumulation on the lens.

The autonomous mode controller 115 is implemented via circuits, chips, or other electronic components that can control various autonomous or partially autonomous operations of the host vehicle 100. The autonomous mode controller 115 may receive the sensor signals output by the LIDAR sensor 105 and possibly other sensors (e.g., RADAR sensors, ultrasound sensors, cameras, etc.) located on the host vehicle 100. The autonomous mode controller 115 may generate control signals to control various vehicle subsystems according to the sensor signals received. Examples of subsystems controlled by the control signals may include steering, braking, accelerating, etc. To control such subsystems, the autonomous mode controller 115 may output control signals to various actuators that can manipulate the steering wheel, brake pedal, or accelerator pedal. The accelerators may operate by converting the control signals into mechanical motion.

The LIDAR defroster 120 may include an electrically powered heating element incorporated into or disposed on the lens of the LIDAR sensor 105. Examples of such heating elements are discussed below with respect to FIGS. 3A and 3B. In one possible implementation, the LIDAR defroster 120 may execute a defrost operation in response to a defrost signal received from, e.g., the processor 130. The defrost operation may include connecting the heating element to a power source (e.g., a battery) to heat the lens. The heat of the lens may melt the frost that has accumulated on the lens. The heating element may be embedded in one or more layers of the lens.

The memory 125 is implemented via circuits, chips, or other electronic components that can store electronic data. Examples of data may include computer-executable instructions. The memory 125 may make such instructions available to other components of the host vehicle 100, such as the processor 130. The processor 130 may, therefore, access and execute the instructions.

The processor 130 is implemented via circuits, chips, or other electronic components that can control certain operations of the host vehicle 100 according to the amount of frost estimated to have accumulated on the LIDAR sensor 105. For instance, the processor 130 may be programmed to receive sensor signals output by the LIDAR sensor 105, estimate the frost accumulation on the LIDAR sensor 105 from the sensor signals, compare the estimated frost accumulation to a predetermined threshold, and prevent a host vehicle 100 from operating in an autonomous mode if the estimated frost accumulation exceeds the predetermined threshold. The predetermined threshold may be set according to a level associated with a likelihood that the frost accumulation may interfere with the accuracy of the sensor signals. In some instances, the predetermined threshold may represent an amount of the lens covered in frost. For instance, the predetermined threshold may be a percentage of the lens. Preventing the host vehicle 100 from operating in the autonomous mode may include the processor 130 being programmed to set a flag in the autonomous mode controller 115 that prevents the autonomous mode controller 115 from taking any actions in reliance on the sensor signals output by the LIDAR sensor 105. Thus, preventing the autonomous mode may include preventing the host vehicle 100 from operating in the fully autonomous mode and one or more partially autonomous modes.

When frost has accumulated on the LIDAR sensor 105, the processor 130 may be programmed to permit non-autonomous operation of the host vehicle 100. When operating in the non-autonomous mode, the processor 130 may be programmed to continue to receive the sensor signals output by the LIDAR sensor 105 and periodically estimate and evaluate the amount of frost accumulation on the LIDAR sensor 105. The processor 130 may be programmed to permit autonomous or partially autonomous operation of the host vehicle 100 when the most recently estimated frost accumulation drops below the predetermined threshold. Permitting the autonomous or partially autonomous modes of operation may include the processor 130 setting a flag in the autonomous mode controller 115 to permit some or all autonomous or partially autonomous vehicle operations.

To help clear the frost accumulation faster, the processor 130 may be programmed to activate the LIDAR defroster 120. The processor 130 may activate the LIDAR defroster 120 by outputting a defrost signal that commands the LIDAR defroster 120, which may be incorporated into the LIDAR sensor 105, to execute the defrost operation. During the defrost operation, the processor 130 may continue to periodically receive and process sensor signals, periodically estimate the frost accumulation, and permit the autonomous mode of operation (including one or more of the partially autonomous modes of operation) when the estimated frost accumulation drops below the predetermined threshold. Permitting the autonomous or partially autonomous modes of operation may include the processor 130 setting a flag in the autonomous mode controller 115 to permit some or all autonomous or partially autonomous vehicle operations.

Even while operating in the autonomous mode, the processor 130 may be programmed to periodically monitor the frost accumulation. That is, the processor 130 may, while the host vehicle 100 is operating in the autonomous mode, receive sensor signals output by the LIDAR sensor 105, periodically estimate the frost accumulation based on the sensor signals generated by the LIDAR sensor 105, compare the frost accumulation to the predetermined threshold, and either prevent or continue to permit autonomous operation according to whether the estimated frost accumulation is above or below, respectively, the predetermined threshold. Thus, the processor 130 may be programmed to allow the host vehicle 100 to remain operating in the autonomous mode so long as the estimated frost accumulation remains below the predetermined threshold.

Referring now to FIGS. 3A and 3B, the LIDAR sensor 105 includes a housing 305 and a lens 310. The LIDAR sensor 105 includes other components located inside the housing 305 and behind the lens 310. Those components have been omitted from FIGS. 3A and 3B for purposes of simplicity.

The lens 310 may be formed from a relatively transparent material such as glass or polycarbonate. A polymer coating designed to assist with water removal could be applied to the lens 310 and work in conjunction with frost removal technologies. Further, to help prevent or eliminate frost buildup, the lens 310 may include a transparent conductive oxide coating such as fluorine-doped tin oxide ($SnO_2F$) or tin-doped indium oxide (ITO). The LIDAR defroster 120 may apply a voltage to the coating on the lens 310, which may cause the coating to heat. The heat may melt frost 315 that has accumulated on the lens 310. In some instances, the coating, which is a low-emissivity material, may reflect heat thereby reducing the amount of frost 315 that can accumulate on the lens 310.

Alternatively, the coating may be implemented via a transparent conductive material such as multi-walled nanotubes formed from graphene nanoribbons spray-coated onto the lens 310. This type of coating may be further coated with a polymeric coating to enhance durability. The coating may generate heat in accordance with a received voltage from, e.g., the LIDAR defroster 120. Thus, the nanotube coating may be used to melt frost 315 that has accumulated on the lens 310.

Another possibility is to incorporate a resistive element into the lens 310. The resistive heating element may include resistive conductors applied to or embedded within the lens 310. The resistive heating element may generate heat in accordance with electrical power received, and the heat generated may melt frost 315 that has accumulated on the lens 310. The conductors may be formed from a silver-ceramic material printed and baked onto the surface of the lens 310 or may be a series of fine wires embedded into the lens 310. The lines may be printed or incorporated into the lens 310 in a pattern that will not interfere with the optical path of the light emitted by the LIDAR sensor 105.

Figure 4:
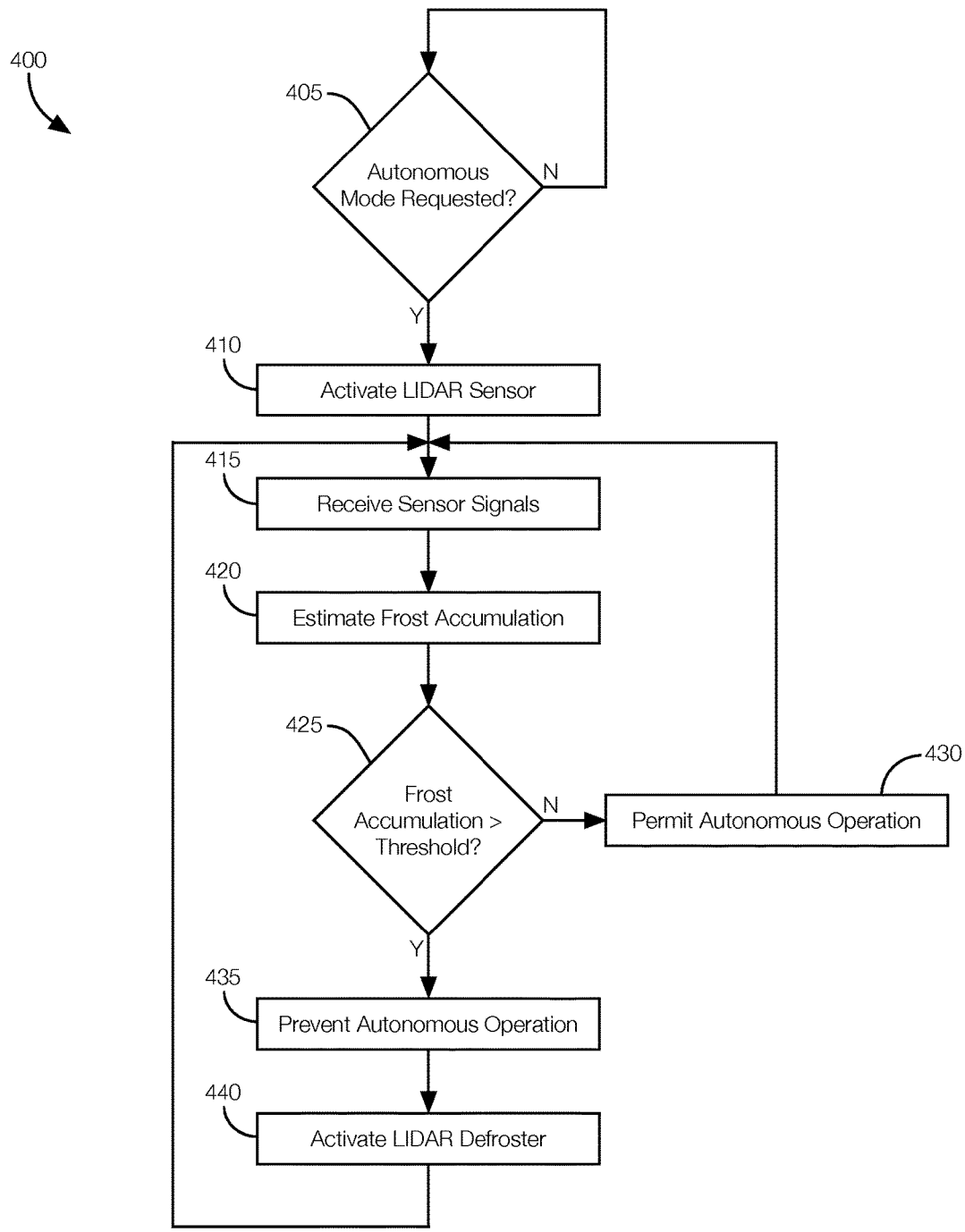
FIG. 4 is a flowchart of an example process that may be executed by the frost detection system for estimating frost accumulation on a LIDAR sensor.

FIG. 4 is a flowchart of an example process 400 that may be executed by the frost detection system 110. The process 400 may begin at any time, such as when the host vehicle 100 turned on. The process 400 may continue to execute until, e.g., the host vehicle 100 is turned off. In some instances, the process 400 may run only under certain environmental conditions based on, e.g., ambient temperature, ambient humidity, whether the host vehicle 100 is parked outside or in a garage, whether it is snowing, etc.

At decision block 405, the frost detection system 110 determines whether the host vehicle 100 is to be used in an autonomous mode. For instance, the processor 130 may determine whether an autonomous mode of operation has been requested. The processor 130 may determine that the autonomous mode has been requested in response to a signal received from the autonomous mode controller 115. The signal from the autonomous mode controller 115 may indicate that a user input, requesting the autonomous mode of operation, has been received. If the autonomous mode of operation is requested, the process 400 may proceed to block 410. Otherwise, the process 400 may continue to execute block 405 until a request for the autonomous mode of operation is received.

At block 410, the frost detection system 110 activates the LIDAR sensor 105. Activating the LIDAR sensor 105 may include the processor 130 outputting a signal to the LIDAR sensor 105 requesting that the LIDAR sensor 105 begin operating and transmitting signals to the frost detection system 110. Alternatively or in addition, the processor 130 may transmit, to the autonomous mode controller 115, a signal requesting that the LIDAR sensor 105 be activated. The process 400 may proceed to block 415 when the LIDAR sensor 105 is activated.

At block 415, the frost detection system 110 begins receiving sensor signals from the LIDAR sensor 105. The sensor signals generated by the LIDAR sensor 105 may be transmitted to the processor 130 for processing. Specifically, the processor 130 may process the sensor signals to determine how much, if any, frost has accumulated on the lens of the LIDAR sensor 105.

At block 420, the frost detection system 110 estimates the frost accumulation on the lens of the LIDAR sensor 105 from the sensor signals. For instance, the processor 130 may process the sensor signals to determine if frost on the LIDAR sensor 105 is immediately scattering the laser light output by the LIDAR sensor 105. The amount of scattering may be directly related to the amount of frost on the lens. That is, more scattering may suggest that a greater percentage of the lens is covered with frost. Thus, the processor 130 may estimate the amount of frost based at least in part on the amount of light scattering.

At decision block 425, the frost detection system 110 determines if the estimated amount of frost accumulation exceeds a predetermined threshold. For instance, the processor 130 may compare the estimated amount of frost accumulation to the predetermined threshold. If the estimated amount of frost accumulation is less than the predetermined threshold, the process 400 may proceed to block 430. If the estimated amount of frost accumulation is greater than the predetermined threshold, the process 400 may proceed to block 435.

At block 430, the frost detection system 110 permits autonomous operation of the host vehicle 100. That is, the processor 130 may output a signal to the autonomous mode controller 115 indicating that the frost accumulation on the lens of the LIDAR sensor 105 will not significantly affect operation of the LIDAR sensor 105. The autonomous mode controller 115 may receive the signal and permit the host vehicle 100 to operate autonomously or partially autonomously in response to receiving the signal from the processor 130. The process 400 may proceed to block 415 so that the frost accumulation may be continually monitored while the host vehicle 100 is operating. Therefore, if frost begins to accumulate on the LIDAR sensor 105 while the host vehicle 100 is operating, it can be removed by the LIDAR defroster 120 (see block 440). In some instances, as discussed below, certain autonomous operations may be prevented during later iterations of the process 400 due to frost accumulation even if autonomous operations were not prevented when the host vehicle 100 is initially started and the process 400 initially executed.

At block 435, the frost detection system 110 prevents the host vehicle 100 from operating in the autonomous mode. For instance, the processor 130 may output a signal to the autonomous mode controller 115 indicating that the amount of frost accumulation on the lens of the LIDAR sensor 105 will significantly interfere with the autonomous operation of the host vehicle 100. The autonomous mode controller 115 may not allow certain autonomous or partially autonomous operations in response to the signal received from the processor 130. In some instances, the autonomous mode controller 115 or the processor 130 may output a signal to a user interface or a user's mobile device instructing the user to manually remove the frost accumulation from the lens of the LIDAR sensor 105 or otherwise indicating that autonomous operation is not available due to the frost accumulation. Block 435 may not prevent the host vehicle 100 from operating in a non-autonomous mode, and the process 400 may continue to execute while the host vehicle 100 is operating in the non-autonomous mode so frost may be removed from the LIDAR sensor 105 while the host vehicle 100 is operating non-autonomously, and so that the host vehicle 100 may be able to operate in the autonomous mode, if needed.

At block 440, the frost detection system 110 activates the LIDAR defroster 120. Activating the LIDAR defroster 120 may include the processor 130 outputting the defrost signal to the LIDAR defroster 120. The defrost signal may command the LIDAR defroster 120 to execute the defrost operation, which may heat the lens to melt the frost that has accumulated on the lens of the LIDAR sensor 105. The process 400 may return to block 415 so that the frost accumulation may be continually monitored while the host vehicle 100 is running. Thus, the autonomous operation may be permitted when the LIDAR defroster 120 has melted enough of the frost to permit the autonomous operation.

The process 400 may continue to execute so long as the host vehicle 100 is operating. The process 400 will allow the frost detection system 110 to periodically receive and process sensor signals from the LIDAR sensor 105 and evaluate and address frost accumulation on the lens of the LIDAR sensor 105 regardless of whether the host vehicle 100 is operating in an autonomous or non-autonomous mode. Further, the process 400 will allow the frost detection system 110 to prevent the host vehicle 100 from operating in the autonomous mode when the frost accumulation will significantly affect operation of the LIDAR sensor 105 (e.g., the accuracy of signals output by the LIDAR sensor 105). Similarly, the process 400 will permit the host vehicle 100 to continue operating in the autonomous mode so long as the frost accumulation will not significantly affect the operation of the LIDAR sensor 105.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a LIDAR sensor having a lens; and
   a processor programmed to receive sensor signals from the LIDAR sensor, estimate frost accumulation on the LIDAR sensor from the sensor signals, compare the estimated frost accumulation to a predetermined threshold representing an amount of frost accumulation on the lens of the LIDAR sensor, output a defrost signal to the LIDAR sensor to command the LIDAR sensor to execute a defrost operation as a result of determining that the frost accumulation exceeds the predetermined threshold, prevent a host vehicle from operating in an autonomous mode as a result of determining that the estimated frost accumulation exceeds the predetermined threshold, and output a signal to a user interface located in the host vehicle instructing a vehicle occupant to manually remove the frost from the lens of the LIDAR sensor to resume autonomous operation of the host vehicle, wherein the processor is programmed to prevent the host vehicle from operating in the autonomous mode by outputting a signal instructing an autonomous mode controller to prohibit autonomous operation of the host vehicle, and wherein the LIDAR sensor executes the defrost operation to melt the frost on the lens of the LIDAR sensor.

2. The vehicle system of claim 1, wherein the processor is programmed to periodically receive sensor signals from the LIDAR sensor while the host vehicle is operating in a non-autonomous mode.

3. The vehicle system of claim 2, wherein the processor is programmed to periodically estimate the frost accumulation on the LIDAR sensor while the host vehicle is operating in the non-autonomous mode.

4. The vehicle system of claim 3, wherein the processor is programmed to permit the host vehicle to operate in the autonomous mode while the frost accumulation is below the predetermined threshold.

5. The vehicle system of claim 1, wherein the processor is programmed to periodically receive sensor signals from the LIDAR sensor while the host vehicle is operating in the autonomous mode.

6. The vehicle system of claim 5, wherein the processor is programmed to periodically estimate the frost accumulation on the LIDAR sensor while the host vehicle is operating in the autonomous mode.

7. The vehicle system of claim 6, wherein the processor is programmed to permit the host vehicle to remain operating in the autonomous mode so long as the frost accumulation is below the predetermined threshold.

8. A method comprising:
detecting an environmental condition including at least one of an ambient temperature and an ambient humidity;
receiving sensor signals from a LIDAR sensor;
estimating frost accumulation on the LIDAR sensor from the sensor signals as a result of detecting the environmental condition;
comparing the estimated frost accumulation to a predetermined threshold representing an amount of frost accumulation associated with interfering with an accuracy of the LIDAR sensor;
activating a defrost operation of the LIDAR sensor as a result of determining that the frost accumulation exceeds the predetermined threshold;
preventing a host vehicle from operating in an autonomous mode as a result of determining that the estimated frost accumulation exceeds the predetermined threshold, wherein preventing the host vehicle from operating in the autonomous mode includes instructing an autonomous mode controller to prohibit autonomous operation of the host vehicle; and
outputting a signal to a user interface located in the host vehicle instructing a vehicle occupant to manually remove the frost from the lens of the LIDAR sensor to resume autonomous operation of the host vehicle.

9. The method of claim 8, wherein activating the defrost operation includes outputting a defrost signal commanding the LIDAR sensor to execute the defrost operation if the estimated frost accumulation exceeds the predetermined threshold.

10. The method of claim 8, wherein receiving the sensor signals includes periodically receiving sensor signals from the LIDAR sensor while the host vehicle is operating in a non-autonomous mode.

11. The method of claim 10, wherein estimating the frost accumulation includes periodically estimating the frost accumulation on the LIDAR sensor while the host vehicle is operating in the non-autonomous mode.

12. The method of claim 11, further comprising permitting the host vehicle to operate in the autonomous mode while the frost accumulation is below the predetermined threshold.

13. The method of claim 8, wherein receiving the sensor signals includes periodically receiving sensor signals from the LIDAR sensor while the host vehicle is operating in the autonomous mode.

14. The method of claim 13, wherein estimating the frost accumulation includes periodically estimating the frost accumulation on the LIDAR sensor while the host vehicle is operating in the autonomous mode.

15. The method of claim 14, further comprising permitting the host vehicle to remain operating in the autonomous mode so long as the frost accumulation is below the predetermined threshold.

16. A vehicle computer comprising a processor and a memory storing instructions executable by the processor, the instructions including:
detecting an environmental condition including at least one of an ambient temperature and an ambient humidity;
receiving sensor signals from a LIDAR sensor;
estimating frost accumulation on the LIDAR sensor from the sensor signals as a result of detecting the environmental condition;
comparing the estimated frost accumulation to a predetermined threshold representing an amount of frost accumulation associated with interfering with an accuracy of the LIDAR sensor;
activating a defrost operation of the LIDAR sensor as a result of determining that the frost accumulation exceeds the predetermined threshold;
preventing a host vehicle from operating in an autonomous mode if the estimated frost accumulation exceeds the predetermined threshold, wherein preventing the host vehicle from operating in the autonomous mode includes instructing an autonomous mode controller to prohibit autonomous operation of the host vehicle; and
outputting a signal to a user interface located in the host vehicle instructing a vehicle occupant to manually remove the frost from the lens of the LIDAR sensor to resume autonomous operation of the host vehicle.

17. The vehicle computer of claim 16, wherein activating the defrost operation includes outputting a defrost signal commanding the LIDAR sensor to execute the defrost operation as a result of determining that the estimated frost accumulation exceeds the predetermined threshold.

18. The vehicle computer of claim 16, wherein receiving the sensor signals includes periodically receiving sensor signals from the LIDAR sensor while the host vehicle is operating in a non-autonomous mode, and wherein estimating the frost accumulation includes periodically estimating the frost accumulation on the LIDAR sensor while the host vehicle is operating in the non-autonomous mode, the instructions further comprising permitting the host vehicle to operate in the autonomous mode while the frost accumulation is below the predetermined threshold.

19. The vehicle computer of claim 16, wherein receiving the sensor signals includes periodically receiving sensor signals from the LIDAR sensor while the host vehicle is operating in the autonomous mode, and wherein estimating the frost accumulation includes periodically estimating the frost accumulation on the LIDAR sensor while the host vehicle is operating in the autonomous mode, the instructions further comprising permitting the host vehicle to remain operating in the autonomous mode so long as the frost accumulation is below the predetermined threshold.

* * * * *